US005592475A

United States Patent [19]
Gliga et al.

[11] Patent Number: 5,592,475
[45] Date of Patent: Jan. 7, 1997

[54] DISTRIBUTED DIGITAL LOOP SYSTEM WITH TRUNK UNIT INTERFACE

[75] Inventors: Alexandru S. Gliga, San Jose; Stephen H. Diaz, Palo Alto, both of Calif.

[73] Assignee: Raychem Corporation, Menlo Park, Calif.

[21] Appl. No.: 163,258

[22] Filed: Dec. 7, 1993

[51] Int. Cl.$^6$ .................................................. H04Q 11/04
[52] U.S. Cl. .......................... 370/359; 379/269; 370/384
[58] Field of Search ............................. 370/67, 58.3, 56, 370/112, 68, 79, 105, 110.1, 46, 53, 94.3, 118, 55, 58.1, 58.2; 379/334, 335, 27, 29, 121, 268, 269, 280, 283, 284

[56] References Cited

U.S. PATENT DOCUMENTS

| | | | |
|---|---|---|---|
| 3,984,642 | 10/1976 | Potter et al. | 179/15 |
| 4,494,229 | 1/1985 | Jolissaint | 370/58 |
| 4,566,094 | 1/1986 | Ardon et al. | 370/56 |
| 4,713,806 | 12/1987 | Oberlander et al. | 370/110.1 |
| 5,014,315 | 5/1991 | Polyak et al. | 380/49 |
| 5,111,497 | 5/1992 | Bliven et al. | 379/451 |
| 5,124,980 | 6/1992 | Maki | 370/77 |
| 5,402,479 | 3/1995 | Ellersick et al. | 370/110.1 |

FOREIGN PATENT DOCUMENTS

| | | |
|---|---|---|
| 0317852A2 | 5/1989 | European Pat. Off. . |
| 2635246 | 7/1989 | France . |
| 4304346A1 | 8/1994 | Germany . |

OTHER PUBLICATIONS

A. R. J. Cook, P. A. Rosher, J. R. Stern, "Design Options for Hybrid Copper/Fibre Broadband Local Loops," IEEE International Conference on Communications '93, (May 1993), Technical Program Conference Record, vol. 3, pp. 1917–1921.

R. Cacheiro, J. Espantaleón, "Switching Systems for Rural Applications," Electrical Communication, vol. 63, No. 3, (1989), pp. 211–220.

Clare G. Keeney, "An Efficient Remote Subscriber Switch With Emergency Switch Protection," NTG–Facherichte ISSLS 90 (1980), vol. 73, pp. 76–80.

N. Frohm, C. L. Hansen, D. Madero, "The DIAmuX System Series—Flexibility in the Access Network," Ericsson Review, 1993, No. 1 (Stockholm, Sweden), pp. 30–40.

J. Chysochos, G. Kokkinakis, M. Koukias, D. Lymberopoulos, "Design, Construction and Testing of an Improved Microprocessor–Controlled Line Concentrator," 6th Mediterranean Electrotechnical Conference (May 1991), Proceedings vol. I, IEEE Catalog No. 91CH2964-5, pp. 562–565.

P. H. Lisle, P. F. Adams, "Exploiting the Copper Network," British Telecommunications Engineering, vol. 10, Apr. 1991, pp. 26–33.

Primary Examiner—Alpus H. Hsu
Assistant Examiner—Ricky Q. Ngo
Attorney, Agent, or Firm—Townsend and Townsend and Crew LLP

[57] ABSTRACT

A digital loop system with a distributed architecture that provides telephone services with high reliability and quality and is cost-effective to install. The system is central office powered and uses a trunk unit interface to interface with a wide range of mechanical and electronic switches. The trunk unit interface connects to remote terminals via digital transmission lines. The remote terminals drive a large number of subscriber circuits through short subscriber loops. The distributed digital loop system employs sealed and environmentally hardened packaging for flexible outdoor installation. The electronic circuitry used by the remote terminals is divided into modules for flexible, incremental deployment of the system.

35 Claims, 9 Drawing Sheets

DISTRIBUTED DIGITAL LOOP SYSTEM WITH TRUNK UNIT INTERFACE

BACKGROUND OF THE INVENTION

The present invention relates in general to telephone communication systems, and in particular to a digital loop carrier system based on a distributed architecture for cost effective and reliable provisioning of basic telephone services.

Existing telephone switch networks typically include a central office (CO) incorporating a group unit that connects to several line units (LUs). In a typical configuration the group unit provides the general cross-connect function and connects to each LU via 120 channels over four E1 links. Each LU supports between 700 to 1000 remote subscriber telephone lines. There are, therefore, from 700 to 1000 twisted-pair copper wires carrying telephone signals and connecting the telephones to each LU located at the CO. The traffic from the 700 to 1000 lines is concentrated onto 120 channels (i.e. 120 channels are shared among the 700 to 1000 lines) resulting in (acceptably low) probability of blocking. The central office connects to other similar central offices via trunks to facilitate telephone communication over a wider geographic area. These trunks are standardized in format. Commonly used standards are R2D and SS7.

In order to control the manufacture of subscriber switch access equipment, major switch manufacturers use a proprietary signaling system over the E1 links between each LU and group unit. Additionally, each switch manufacturer has developed a different interface standard. As a result, not only access to the telephone switching networks is severely limited, interfacing one type of equipment to several different switch types is expensive and complicated. To service large, newly developed areas, the user must either subscribe to an existing switch or a compatible switch attaching to the existing network must be purchased and installed.

In an area where the existing telephone network infrastructure is in place (such as the United States) the incremental cost of new hardware is relatively insignificant as compared to the extra support and maintenance costs associated with a different type of system. However, in those regions of the world where telephone lines are yet to reach large segments of the population, costs associated with obtaining and installing new CO switches, as well as the installation of copper twisted pairs over long distances for each subscriber can be a major barrier to extending service.

From the foregoing it can be appreciated that there is a need for a cost effective method of providing for basic telephone services where large numbers of newly added telephone lines are required.

SUMMARY OF THE INVENTION

The present invention is a digital loop carrier system based on a novel distributed architecture that provides for rapid and cost effective deployment of telephone services for large numbers of subscribers.

The distributed digital loop (DDL) system of the present invention employs a trunk unit interface (TUI) to connect to, and digitally interface with a central office (CO) switch. The TUI also connects, via digital transmission lines, to a distribution unit (DU) that is located in the field in the general vicinity of the subscriber. The DU connects to a number of remote terminals (RT) via digital lines. Each RT is located very close to the subscriber and generates the equivalent of from 16 to 160 subscriber telephone lines. This service is typically delivered to the subscribers using twisted-pair copper wires. Because of the distributed nature of this arrangement and the relatively high subscriber density the resulting subscriber loops are very short, usually less that 500 feet. The distributed arrangement and the resulting short subscriber loops further provide for substantial power savings.

A major advantage of the DDL system of the present invention over the conventional telephone network is the ability to transmit signals digitally over the long distance between the remote terminals (located close to the subscribers) and the TUI/CO switch. This can be accomplished using only six E1 links (12 pairs) from the CO to the DU and using only one E1 link (two pairs) from the DU to the RT. Thus, in addition to improved transmission quality, the drastic reduction in the amount of required copper wiring provides for substantial cost savings. Instead of requiring about 1000 pairs of wires to install a new line unit, only 12 pairs are needed to connect a TUI to a DU. The DU in turn supports several remote terminals, each generating up to 160 telephone circuits.

Many of the benefits of the DDL system are derived as a consequence of placing the remote electronics very close to the subscriber. But this requires a system that is quite flexible in its configuration to accommodate the variety of topologies that can be encountered. According to a preferred embodiment of the present invention, the DDL system uses modular architecture and packaging to permit flexible deployment of the multiplexing electronics close to the subscriber in a variety of topologies. This allows the electronics, which is the most costly part of the system, to be deployed in small increments based on service demands, and keeps initial costs to a minimum. This feature, in addition to the much reduced amount of required cable, results in a system that is highly cost effective to install.

Because this deployment approach requires the multiplexing electronics to be placed in relatively small subsystems located outdoors, the present invention provides for very secure and flexible environmental protection for all system components. Accordingly, in a preferred embodiment, the DDL system of the present invention provides modular packaging for remote terminals that includes at least one backplane module with gel sealed connectors adapted to receive at least one especially sealed active electronics module. The backplane module connects to a terminal block that incorporates a group of gel sealed terminals. The backplane module also includes a gel sealed connector for connecting to other backplane modules. This flexible modular packaging allows the subsystems of the present invention to be expanded and rearranged as the system grows and as more advanced digital services are demanded.

A further understanding of the nature and advantages of the DDL system of the present invention may be gained by reference to the following detailed description and drawings.

DESCRIPTION OF THE SPECIFIC EMBODIMENTS

Figure 1:
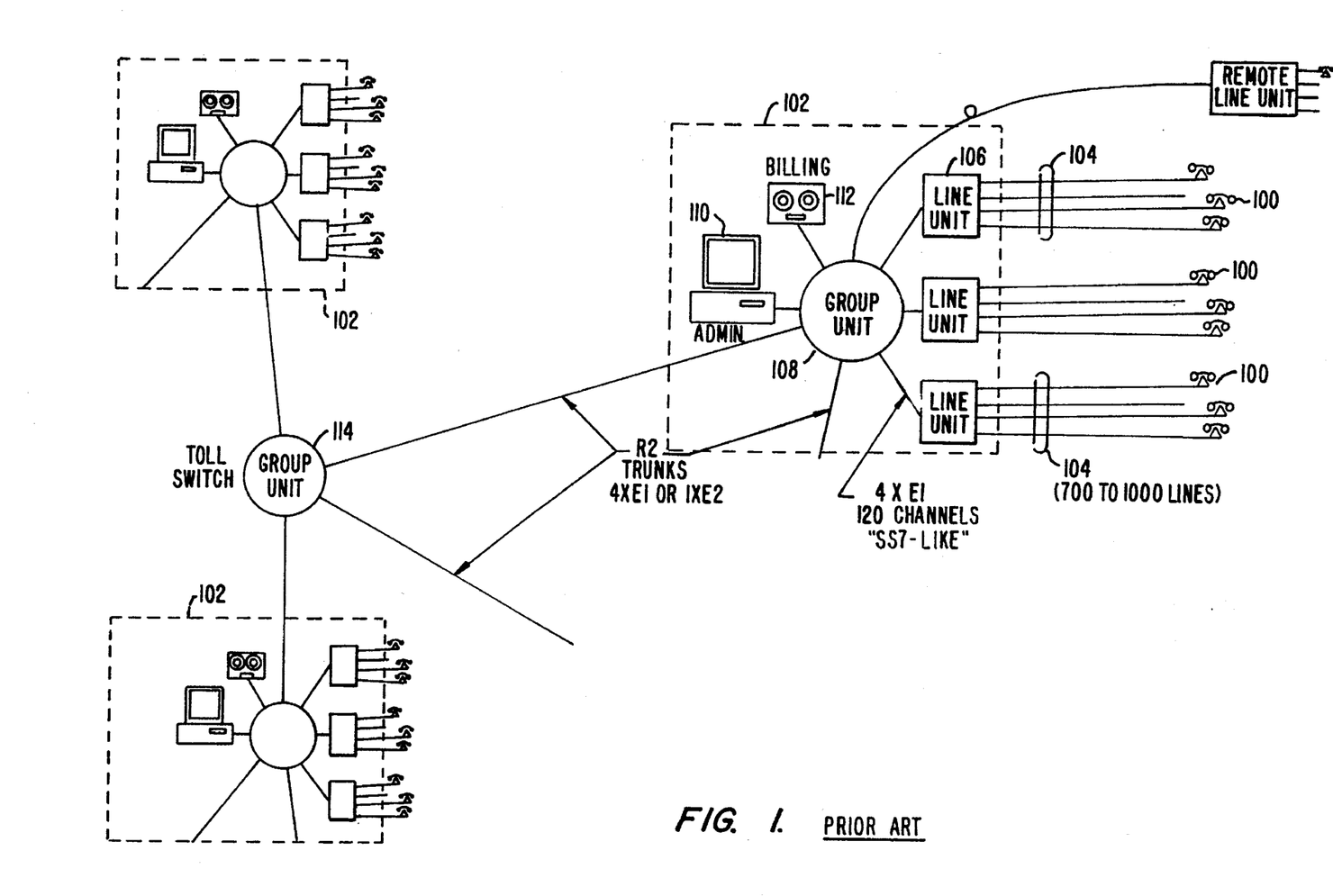
FIG. 1 illustrates a conventional telephone switch network.

The existing analog telephone networks in the United States and around the world have evolved over a long period of time. This evolution has resulted in a hierarchical tree network interconnecting subscribers and switching offices over analog telephone lines that are long established in the industrialized countries. FIG. 1 is a simplified diagram showing part of a typical local telephone network. Subscribers 100 connect to a central office (CO) 102 through analog telephone lines 104. Several line units 106 at the CO 102 handle from 700 to 1000 telephone lines each. Each line unit 106 concentrates the 700 to 1000 telephone lines onto 120 digital channels that connect to a group unit switch 108 via four E1 type links. Each E1 link comprises 30 voice channels with two additional channels for signaling. The group unit switch 108 provides the general crossconnect functionality as well as administration and billing functions via computer systems 110 and 112 respectively. In the North American telephone network hierarchy, the CO switch at this level is called an End Office which connects to other similar End Offices and Toll centers 114 using trunks based on standardized signaling such as R2 or SS7. Toll center 114 is essentially a group unit switch that provides the crossconnect switching between several End offices and other Toll centers. The North American telephone network uses up to five levels of hierarchy in this fashion to make up the entire network.

In the conventional local or End Office system design the functions performed by each of these components is as follows: The line units 106 perform the tasks of projecting signals over the relatively long distances on the telephone wires 104 to the subscriber telephones 100 and concentrating the traffic before passing it on to the group unit 108. The group unit 108, as noted above, performs the general crossconnect functionality as well as administration and billing functions. The connection between the group unit 108 and the line units 106 is generally proprietary to the switch manufacturer.

Concentration is essential for economic switch design. Even at the peak traffic hour only a small number of subscribers require service at the same time. The cost of the group unit can be greatly reduced by providing only enough crosspoints to support this peak traffic. Line units 106 are therefore equipped with a concentrator whose function is to ensure that those few subscribers that need a connection are routed through the link to the group unit 108. The efficiency of this process is, of course, strongly dependent on the size of the pool of subscribers connected to the concentrator in the line unit. The larger the size of the pool, the more efficient the concentration. This has resulted in the line unit 106 being fairly large. The large size of the pool of subscribers (up to 1000 in FIG. 2) requires that the line unit 106 reach long distances to cover the wider geographic area over which the 1000 subscribers are scattered. The resulting requirement to project analog signals over longer distances causes the system to incur sever power and cost penalties. These penalties are unavoidable in the conventional architecture. The unique distributed architecture of the present invention provides for substantial reductions in these cost and power penalties in a digital loop system that can work with most group units regardless of their manufacturer.

Figure 2:
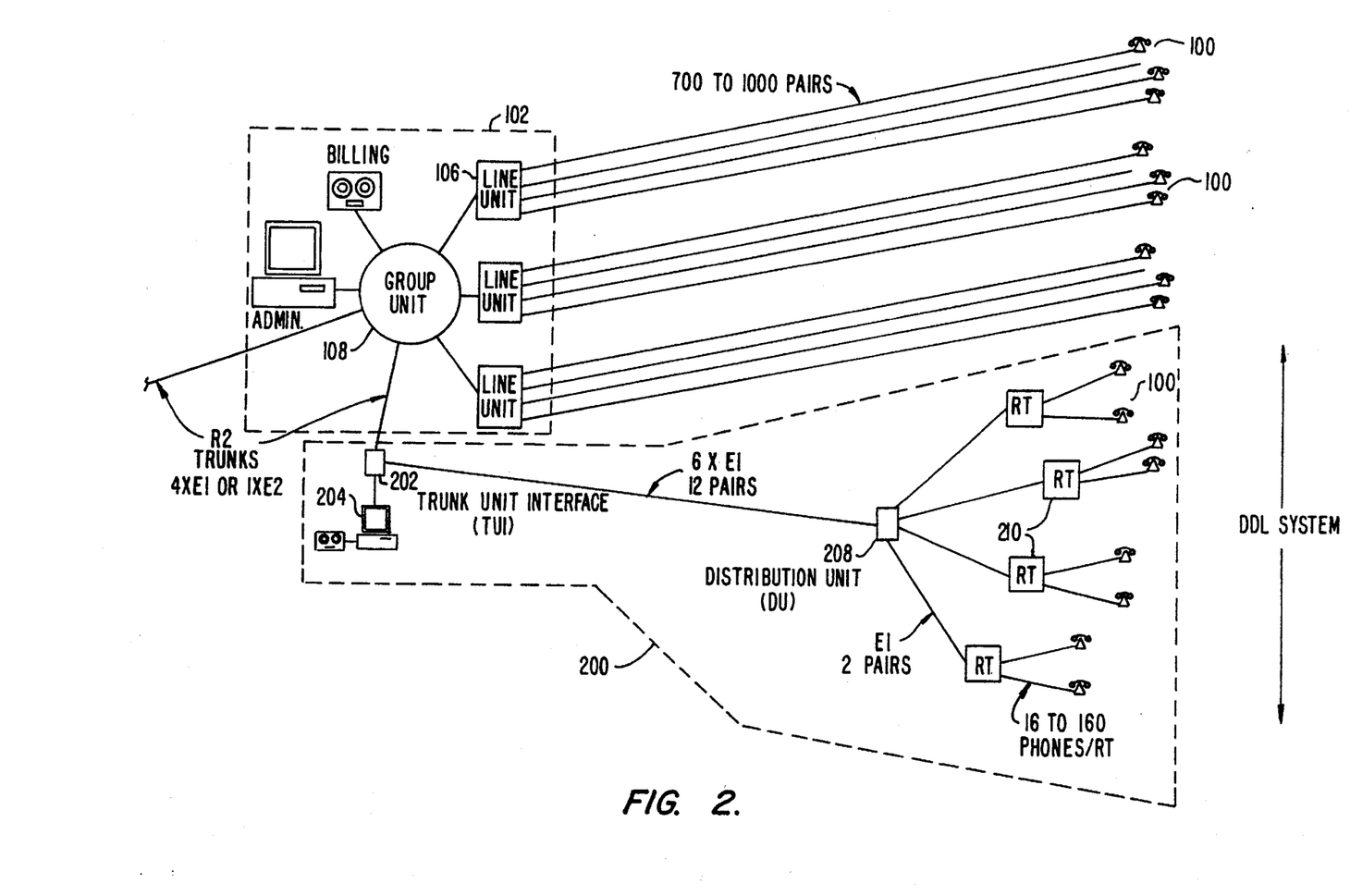
FIG. 2 shows a distributed digital loop (DDL) system according to the present invention connecting to the conventional telephone switch network.

FIG. 2 shows a digital loop carrier system 200 according to the present invention that is based on a novel distributed architecture which is capable of tapping directly into the existing telephone network. The distributed digital loop (DDL) system 200 utilizes a trunk unit interface (TUI) 202 which is the common control for the DDL system. The TUI 202 provides for interfacing to the CO 102 switch as well as a combination of some of the functions of the group unit 108 and the line unit 106 (administration, billing, maintenance, and concentration). The TUI 202 communicates with the group unit through a standard interoffice trunk over up to four E1 links using standard R2 trunk signaling. Although the connection is similar to the connection between a Toll center 114 and group unit 108, the TUI 202 is preferably physically located in the same building as the switch to which it is connected. This arrangement provides a universal, standardized interface to the network. The TUI 202 is therefore capable of interfacing with most existing CO switches regardless of the manufacturer without requiring any modifications.

Because the DDL system of the present invention does not use the billing and administration resources of the switch group unit 108, it is necessary to provide these functions through an operator interface. The TUI 202 employs a small computer such as a personal computer (PC) 204 for this purpose. The TUI 202 is capable of collecting signaling information and concentrating the traffic that arrives from the subscribers 100 and then rearranging this traffic to conform to trunk standards so that the group unit 108 will accept the traffic as though it has arrived from a distant switch. However, the rest of the electronic system is distributed to a location very close to the subscriber to optimize power and performance.

Accordingly, a digital transmission line comprised of several, for example six, E1 links connects the TUI 202 to a remote distribution unit (DU) 208 that is located in the general area of the subscribers 100. The DU 208 then connects to a number of remote terminals (RTs) 210 via single E1 links (requiring 2 pairs). Each RT 210 is located very close to the subscribers 100, usually within 1000 feet. Transmission from the RT 210 to the subscribers is via analog transmission. The number of subscribers 100 served by a single RT 210 will vary depending on the topology. In a typical deployment the RT 210 will supply from 16 to 160 individual phone lines via twisted-pair copper wires.

Figure 3:
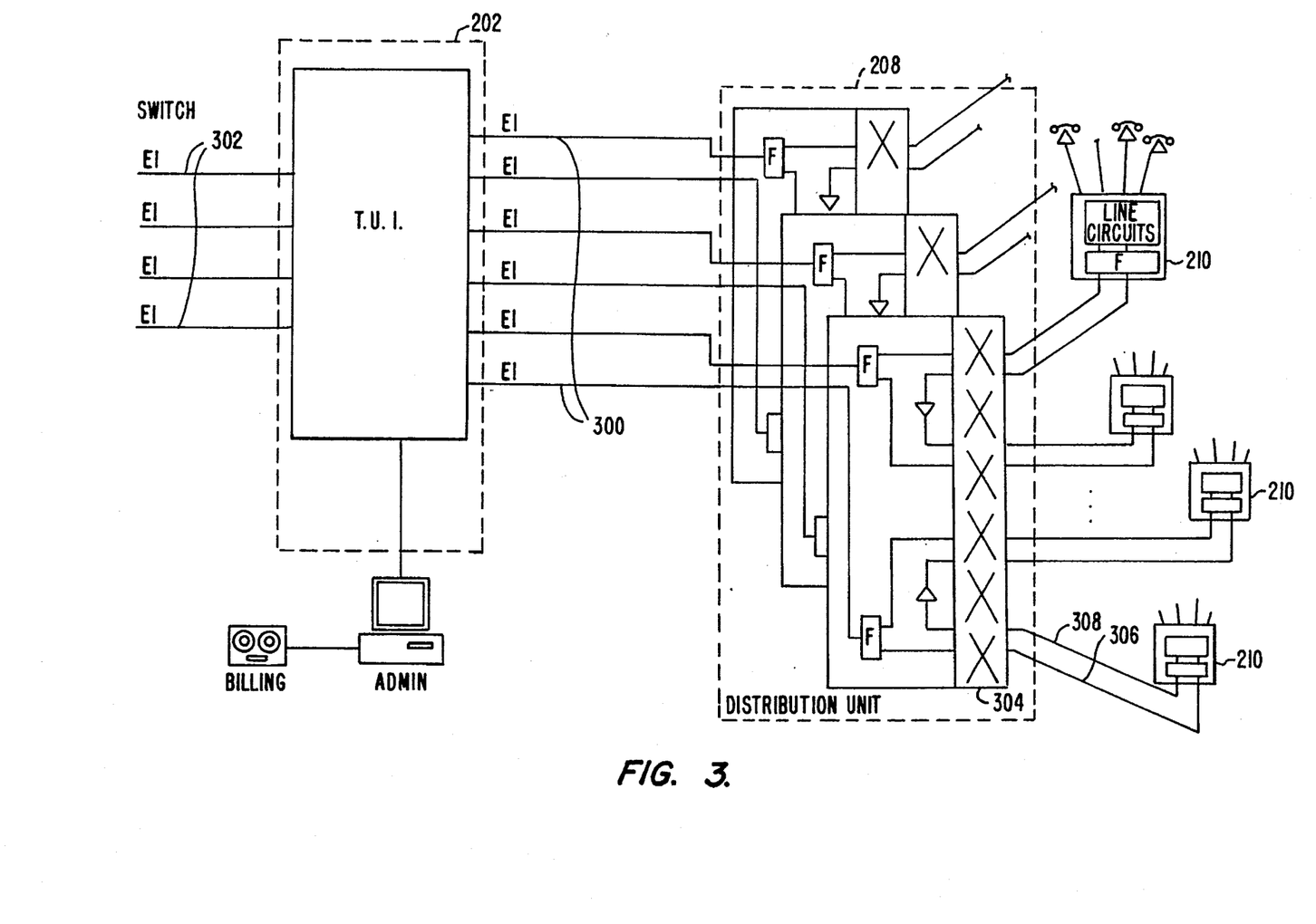
FIG. 3 shows in more detail the structure of the DDL system of the present invention.

FIG. 3 shows the DDL system of the present invention in more detail. To maintain the same probability of blocking as in the conventional system, up to six E1 links 300 (i.e. 180 transmission channels) connect the DU 208 to the TUI 202, and four E1 links 302 connect the TUI 202 to the group unit 102. The DU 208 performs several functions. First, by locating it at an existing cable cross connect cabinet it provides a convenient distribution point for spreading the signals and power out to the individual RTs 210. Secondly, it provides a means for connecting several small RTs 210 onto a single E1 link 300 to increase the overall efficiency of the system. Thirdly, it provides a means for sharing the power among the six E1 links 300 so that if one E1 link 300 is carrying heavy traffic it can draw power from other E1 links 300 that statistically must not be so heavily loaded.

FIG. 3 shows one example of the physical arrangement of the DU 208. The DU 208 is divided into three independent sections that are commonly controlled by a single processor (described in a later section). Each section includes two E1 links 300 and a remotely switchable cross-connect 304, and can support up to eight RTs 210. One pair of wires 306 goes to an RT 210 and one pair 308 returns. The returning pair 308 is then looped at the DU 208 to the next RT 210 on the loop. This way, multiple RTs 210 can share a single E1 loop. A single loop may have from one to eight RTs 210. The connection between the RTs 210 forms a logical ring and a physical star. This provides several advantages. The logical ring connection, with each RT 210 regenerating the signal, avoids time of flight problems created by unequal delays that often occur in logical star configurations. At the same time, because of the physical star arrangement, maximum copper cross-section is available to deliver power and signals from the DU 208 to the RTs 210. A fourth function of the DU 208 is to provide a remotely switchable cross-connect 304 that makes it possible to rearrange the RTs 210 on the six E1s 300. Note in FIG. 3 that each RT 210 has access to two E1 links 300 back to the TUI 202. The remotely switchable cross-connect 300 is used to redistribute RTs 210 from one E1 300 to another in case of a fault.

Figure 4:
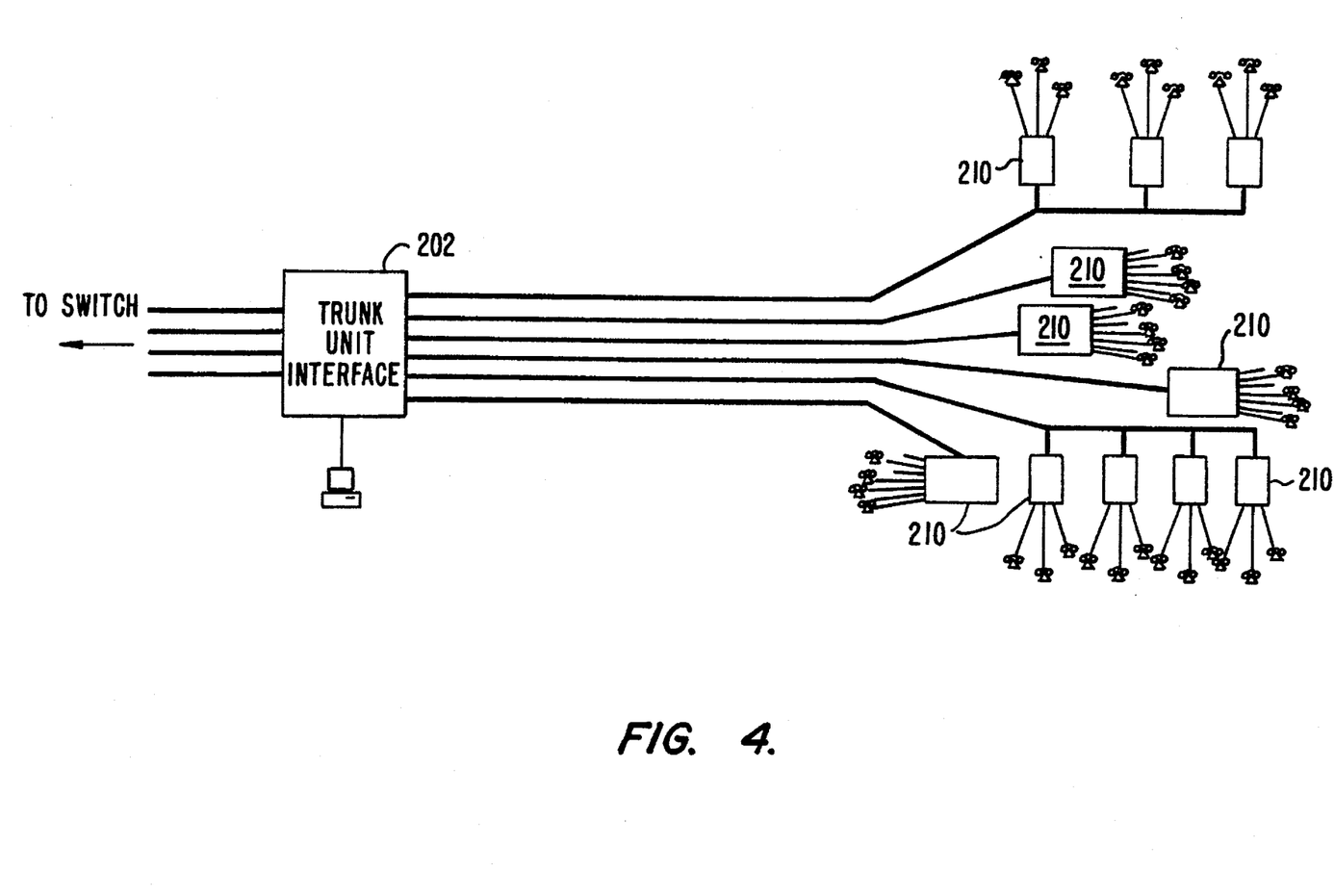
FIG. 4 shows the logical configuration of the DDL system of the present invention.

FIG. 4 shows the logical configuration of the DDL system. The DU 208 is controlled by signals from the TUI 202. These signals are transmitted over part of a signalling channel residing in one of six E1 links between the TUI 202 and the remote terminals 210. For signaling purposes the DU 208 looks to the TUI 202 as just another member of the loop it resides on. The other five links are simply repeated by the DU 208 on to the RT 210 loops. Thus from the TUI 202 perspective, there are six E1 loops to remote equipment each of which contains RTs 210 and one of which contains a DU 208 as well as RTs 210. The detailed description of system components will be described hereinafter.

Trunk Unit Interface

Figure 5:
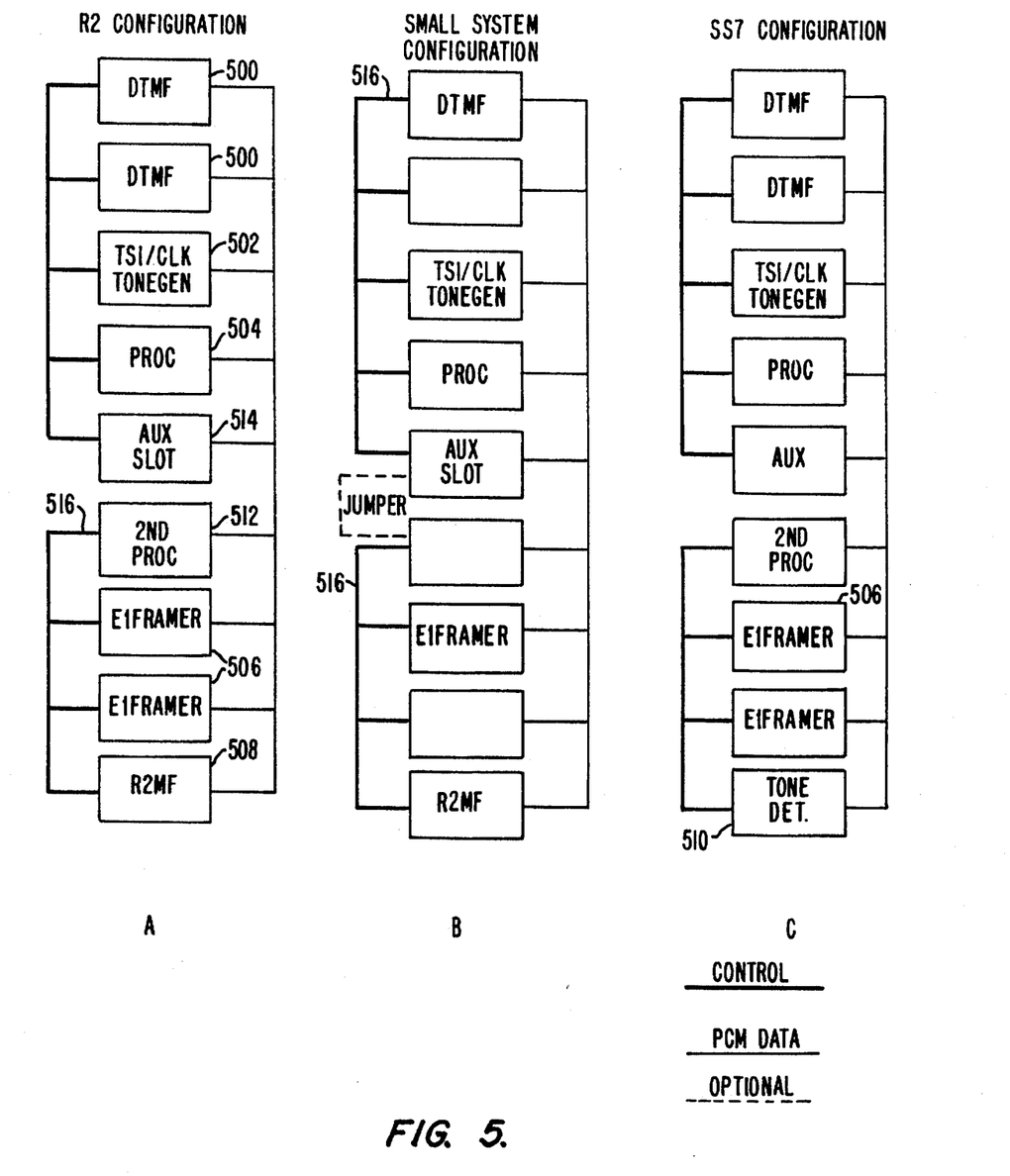
FIGS. 5A, 5B and 5C show the components of a trunk unit interface for various configurations of the DDL system of the present invention.

The TUI 202 is the main controller of the DDL system. It contains circuits to provide call processing functions and communication. FIGS. 5A, 5B, and 5C show the components of the TUI 202 for a conventional R2 interface, for a small system with an R2 interface, and for a system with an SS7 interface, respectively. The TUI 202 includes dual tone multi-frequency (DTMF) cards 500 each carrying 12 DTMF receivers to interpret subscriber DTMF phone numbers. There may be one or two DTMF cards 500 in a DDL system depending on the traffic. A TSI/CLK/ToneGen card 502 provides a time slot interchange (TSI), clock synchronization, and a tone generator. The TSI allows any internal DDL time slot to be connected to any CO switch 102 trunk time slot. The clock synchronization circuitry allows any one of the four E1 lines from the CO switch 102 to be used as the master clock for the DDL system. The tone generator circuitry generates the tones required to provide subscriber services (e.g. dial tone, ringback, reorder, etc.).

The TUI 202 includes a processor 504 to control the operation of the TUI 202. In addition to the usual processor circuitry (68000 type processor, random access memory (RAM), read-only memory (ROM), processor 504 includes a significant amount of non-volatile memory to store critical program software. The DDL system uses synchronous data link control (SDLC) protocol between the TUI 202 and the RTs 210. Therefore, the TUI 202 includes two SDLC controllers to permit the processor 504 to communicate with the RTs 210 and DU 208. Processor 504 is provided with two ports for communicating with two (redundant) PCs, so the processor 504 can have constant access to a functioning PC to store billing and other critical data. Typically, there will be one PC (PC 204 in FIG. 2) that provides for user interface for billing, administration, and maintenance purposes. This unit will also provide an RS-485 serial bus compatible port so multiple DDL systems in the same central office can share a PC. The second PC performs the same functions and provides an optional backup. The large amount of non-volatile memory included in processor 504 allows the system to operate without loss of data for several hours even if both PCs are out of service. Therefore, the processor 504 handles all call processing, maintenance and administration functions.

The TUI 202 further includes E1 framer cards 506 that control the E1 links. When the standard E1 transmission format is used, it is necessary to determine the starting point for each data frame. This function is performed by an E1 framer card 506. Each E1 card 506 provides two switch links and three DDL links. There may be one or two E1 framer cards 506 in a DDL system depending on the system size. The E1 framer cards 506 also provide phantom power distribution to the DU 208.

The DDL system of the present invention supports interfacing to both analog and digital switches since both types provide the standard trunk interfaces. To facilitate interfacing to a digital R2 switch, the TUI 202 incorporates an R2MF card 508 which provides for R2 protocol tone generation and detection. R2 is an in-band compelled signaling protocol that uses special tones to communicate signaling information. In addition to these signals, the state of the lines in each direction is communicated by manipulating a few of the bits in the E1 signalling channel 16. The SS7 signalling system is a fully digital system but the protocol states that a switch must request a continuity check before placing a call to another switch. The first switch then transmits a test tone that must be received and verified by the receiving switch. A tone detect card 510 provides detection of the continuity test tones for the SS7 protocol when the TUI 202 is interfacing to an SS7 switch.

The TUI 202 may include a second processor 512 which is identical to processor 504 and uses its two SDLC controllers to communicate with the CO switch 102. The second processor 512 is used to provide the capability of interfacing to different types of switch links with minimum modifications to the software. This allows most of the TUI 202 software to be written independently of the switch interface. To change between R2 trunk interface and an SS7 trunk interface requires exchanging the R2MF card 508 for a tone detect card 510 and downloading new software to the second processor 512. No software changes are necessary in the main processor 504. The second processor 512 provides the switch interface protocol, controls the R2MF card 508 or tone detect card 510, and controls the E1 framer cards 506. The second processor 512 cooperates with the primary processor 504 to provide the complete set of DDL call processing functions.

Finally, the TUI 202 includes an auxiliary slot 514 which provides a spare slot in the backplane for future capabilities. Control buses 516 provide the interconnection between all TUI 202 components. The auxiliary slot 514 also provides the capability of installing a jumper card 518 to connect the control buses 516 of the TUI 202 so the second processor is not needed in small systems.

Distribution Unit

Figure 6:
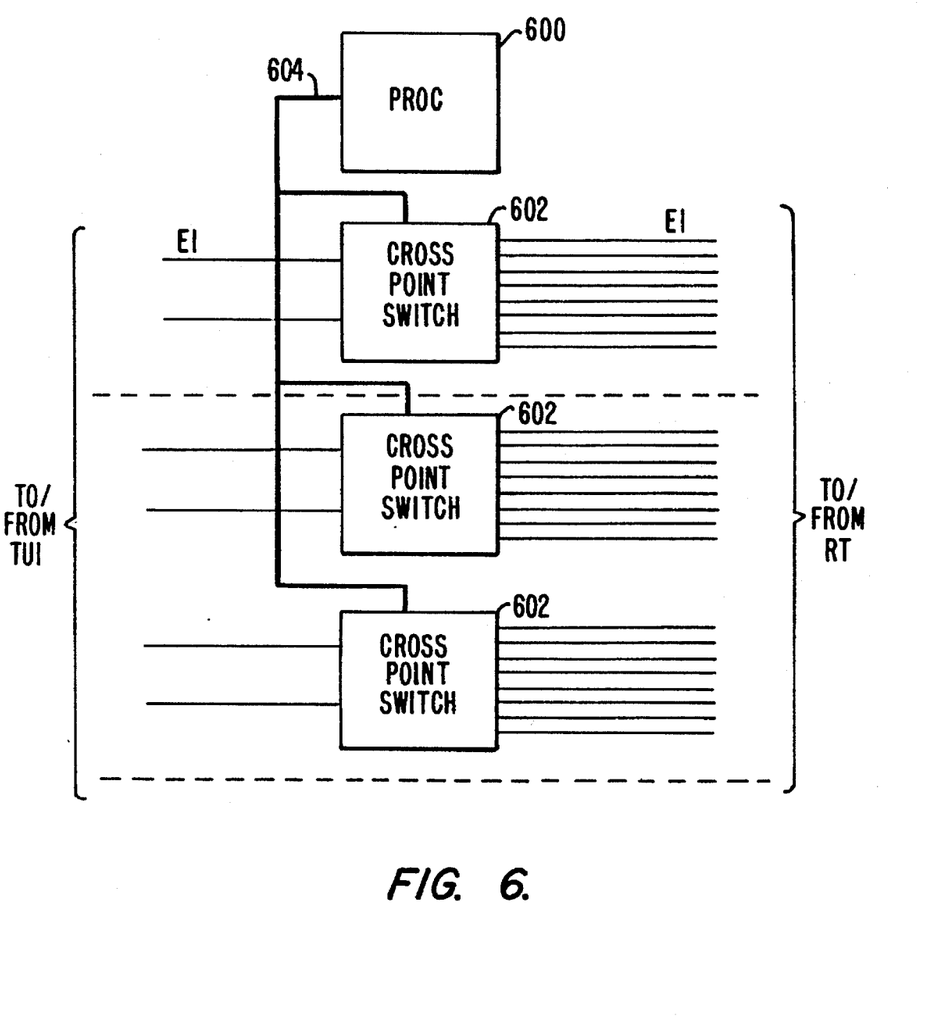
FIG. 6 shows the components of a distribution unit according to an embodiment of the present invention.

FIG. 6 shows the components of the DU 208 in an exemplary configuration. The DU 208 includes circuits to distribute power to the RTs 210, repeat E1 data between the TUI 202 and the RTs 210, and provide a means to switch RTs 210 among a subset of the E1 links for traffic control and fault recovery purposes. There is a processor 600 that controls all the DU 208 circuitry, including the cross point switch circuit cards 602. Processor 600 communicates with the TUI 202 using SDLC in one channel, for example channel 16, of one of the six E1 links (FIG. 2 and 3). Processor 600 controls the configuration of the cross point switch circuit cards 602 via a backplane control bus 604. Processor 600 monitors several parameters to determine if a serious fault has occurred. It monitors the digital error rates in the E1 links to the TUI 202 and the RTs 210. It also looks for power shorts in any of these links. If a fault is identified, the DU 208 will report the problem to the TUI 202 and follow instructions. If communication to the TUI 202 is interrupted, then the DU 208 will follow a default fault correction procedure that is stored in its local memory. The TUI 202 will take actions such as switching an RT 210 from one E1 to another, or switching a bad RT 210 unit out of the string. In this exemplary configuration, each cross point switch card 602 connects two TUI E1 links to eight RT E1 links. The DU 208 includes three cross point switch cards 602, each capable of connecting any of the eight RT E1 lines in a loop to any of the two TUI E1 lines. For example, one TUI E1 could be linked in a loop with three RTs 210, and the other TUI E1 could be linked in a loop with five RTs 210 (see also FIGS. 3 and 4). This configuration of the DU 208 allows any of the RTs 210 to be completely isolated from the loops for maintenance purposes. Also, processor 600 can connect its control channel to one of several of the control channels to the TUI E1s.

Figure 9:
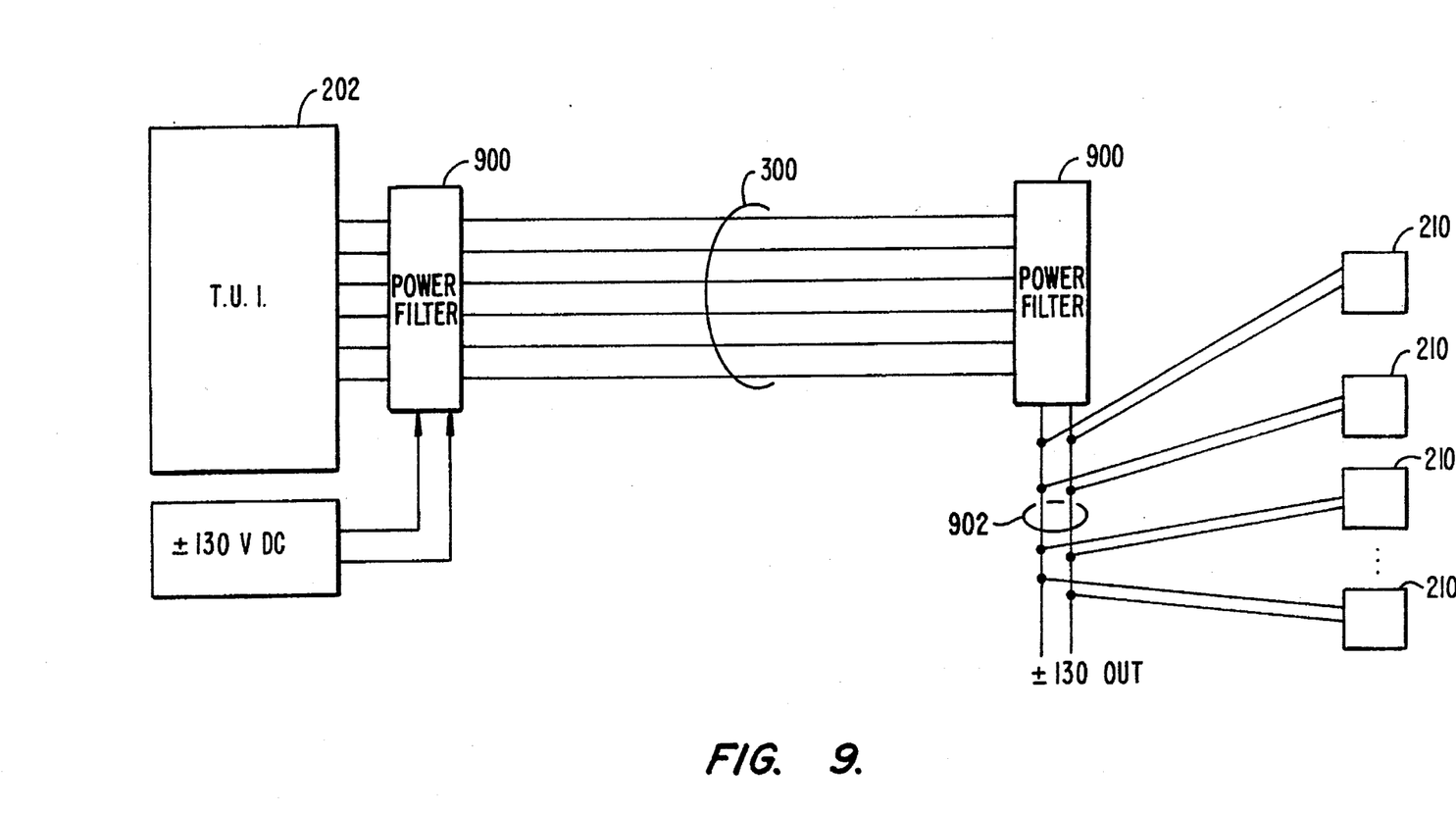
FIG. 9 shows the power distribution scheme used by the DDL system.

The power that is being supplied to the DU 208 and RTs 210 over the six E1 links 300 is combined in the DU by means of a diode "OR" network. With the "OR" diode network, any of the RTs 210 may draw power from any one of the six E1 links 300. FIG. 9 illustrates the logical connection of power via six E1 links to six corresponding diodes 900. The outputs of the six diodes 900 are coupled together at a common node 902 that connects to all RTs 210. This allows the power from all six E1 links 300 to be distributed as needed by RTs 210 such that if one E1 link 300 is carrying heavy traffic it can draw power from other E1 links 300.

Remote terminals

Figure 7:
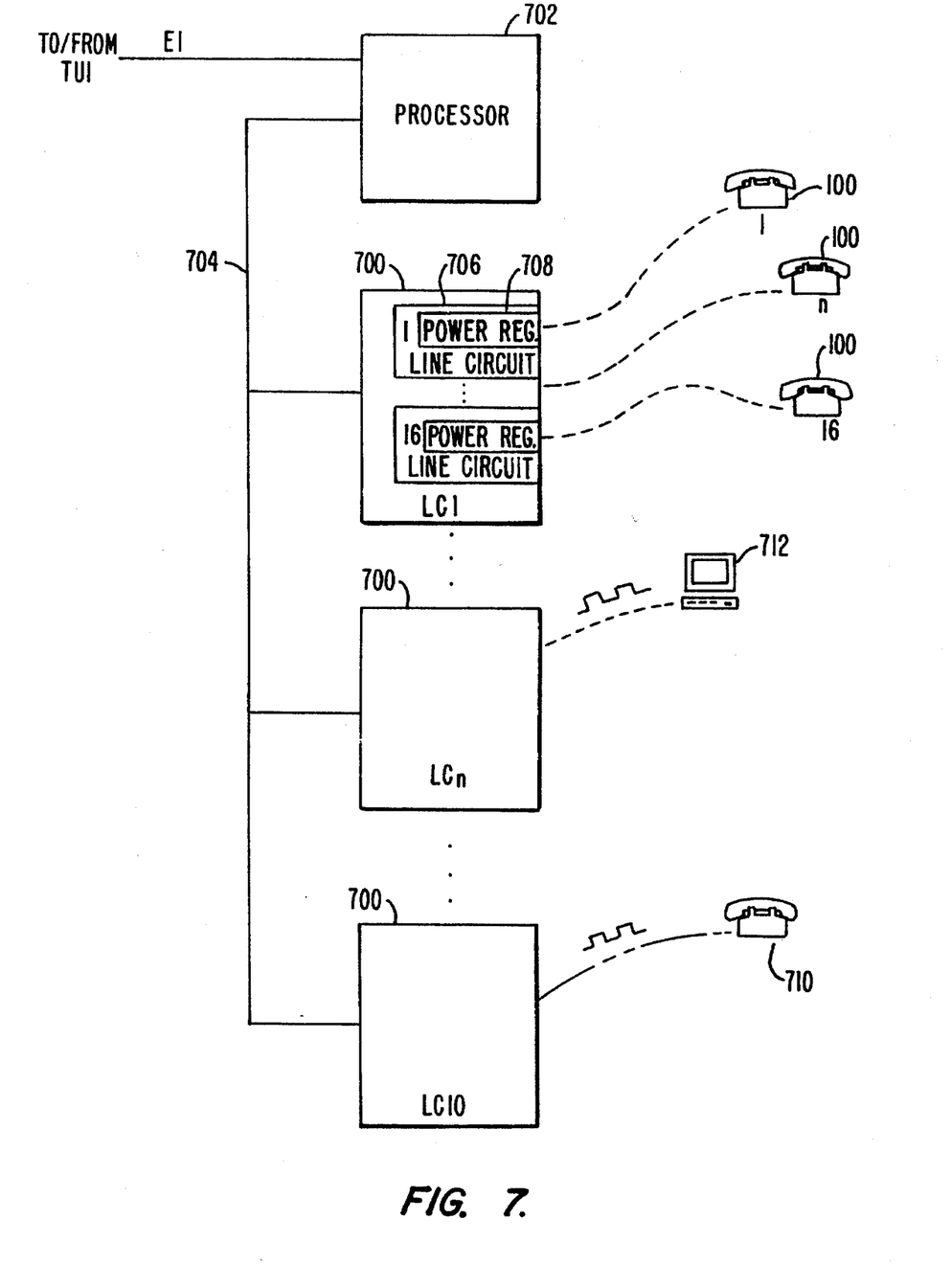
FIG. 7 shows the configuration for an exemplary remote terminal used in the DDL system of the present invention.

FIG. 7 shows the components of the RT 210. The RT 210 provides control of several, for example ten, line cards 700 which interface to subscriber telephones 100. Each line card 700 contains 16 individual subscriber interface circuits 706. RT 210 includes a processor 702 that controls all the RT 210 circuitry including the line cards 700. The processor 702 communicates with the TUI 202 using SDLC in channel 16 of the E1 link that the RT 210 is connected to and controls the operation of the line cards 700 via a backplane control bus 704. The processor 702 monitors the RT 210 power consumption and takes protective action if power thresholds are exceeded. The processor 702 scans the line card 700 supervision bits and reports subscriber line status to the TUI 202. The RT 210 controls the line cards 700 under the direction of the TUI 202 and controls the line card circuitry independently only if all communication with the TUI 202 has been lost. The line card 700 is a multi-port (16 in this example) analog line circuit, which provides analog tip and ring interface to the subscriber 100. Each one of the 16 line circuits 706 of a line card 700 performs analog to digital PCM conversion of the subscriber voice. The DDL's unique architecture, where the subscriber loops are very short, allows for a simple low-cost and highly power efficient design for the line circuit 706. An important consideration in the design of a line circuit 706 is the amount of longitudinal noise that the telephone pair collects due to inductive coupling to energy sources such as power wires. Currents flow in the subscriber loop due to capacitive coupling to the ground shield around the cable and other structures. To remedy this problem, very careful balancing of the subscriber loop interface circuit (SLIC), which is part of the line circuit 706, is required so that these effects on each of the two wires in the pair cancel. But in the case of the DDL system of the present invention, the subscriber loop is very short. This results in smaller amount of inductively coupled noise and lower capacitance to ground. Thus the balance of the line circuit in the system of the present invention can be much less than for a line circuit located in a CO that must transmit up to 18,000 feet. This allows the use of a less expensive design. Another important factor in the design of the line circuit 706 is floor space in the central office which is very expensive. It is therefore necessary to make the conventional line unit 106 (containing 1000 lines) as small as possible. In the DDL design, however, the functionality of the line unit 106 is broken up into from 6 to 24 RTs 210 which are mounted outdoors. In this case, space is much less of a concern. Therefore, less costly and more robust transformer-based SLICs can be used for the line circuits, even though they are more bulky than the solid state SLICs that are currently used in CO equipment. This further reduces costs associated with the extra electrical protection that the solid state SLIC requires.

The DDL system of the present invention supports fully digital subscriber equipment and therefore is not limited to analog telephone sets 100. The RT 210 can be equipped with a variety of different line circuits 706 to provide, for example, a 64 kBit digital service to subscriber equipment such as digital telephones 710 and computers 712. Pay phones are another type of subscriber equipment that can be supported by RT 210.

In addition to the flexibility and cost savings, the line circuit 706 of the present invention meets certain special performance requirements to keep the power consumption to an absolute minimum such that the entire 1000 line system can be powered from the CO without batteries in the filed. The power considerations are described hereinafter.

Power Management

One advantage of the DDL system of the present invention is its ability to power a 1000 line DDL system over only the 12 pairs (six E1 links) that connect the CO to the DU 208 and then over only the two pairs (one E1 link) that connect the DU 208 to each RT 210. This is accomplished by a combination of means. First, the energy is delivered at an elevated voltage employing the commonly used super phantom arrangement. Industry standards such as Bellcore -TR-NWT-001089 suggest that in the interest of craftsman safety the voltage from any conductor to earth should be less that 140 volts and the power that can be delivered by any pair be less than 100 watts. In the preferred embodiment, +130 VDC relative to earth ground is applied to half of the pairs and −130 VDC is applied to the other half. This provides a working voltage of 260 volts and still satisfies the safety considerations listed above. This is a common technique employed in rural telephony were long transmission distances are encountered.

Secondly, the traffic considerations are included in the power management of the system. Although there are 1000 subscribers, only 120 channels into the switch are available. Therefore, it is only necessary to supply power to 120 phones maximum. In the unusual case where more than 120 subscribers attempt to call at the same time, the blocked 121st caller will be supplied with a special warning tone for 15 seconds and then all power will be turned off to that loop. The production of the warning tone requires very little power, since even with only a 5% duty cycle, the special tone can be clearly heard. Thus in practice, as lines are taken off-hook the power used by the system will go up until a total of 120 lines are off-hook. Then as more are taken off-hook, the power consumed by the system will increase only slightly all the way up to all 1000 off-hook.

Further power savings are achieved by including several provisions in the design of the subscriber loop circuit and supporting systems that reduce the amount of power required by an off-hook line. Telephones require a minimum of 20 mA for normal off-hook operation. Additionally, some answering machines require 35 volts in the on-hook state to operate properly. So the line circuit 706 is designed to provide 35 volts at less than 1 mA when the subscriber's equipment is in the on-hook state. But when the subscriber line goes into the off-hook state, a power regulator circuit 708 in the line circuit switches to a constant current mode, supplying about 20 mA. Because of the very short subscriber loop length, it takes only about 500 mW to power this loop in the off-hook state. The ring generator also can operate at reduced voltage (and therefore power) due to the short loop length. A simple, energy efficient telephone ring generator has been designed by summing the outputs of three square wave generators and then smoothing the resulting wave using a small capacitor. Square wave forms of this type are easily produced by the digital equipment that is available to support the other digital functions of the system.

Another important consideration in reducing the power needed by the system relates to the on-hook power. At any given time, the majority of the telephones in a system are in an on-hook state. For example, during a period of very heavy traffic, if 100 lines are off-hook then 900 are on-hook. Because of this large number, the power used by an on-hook line is very critical. The transformer-based SLIC used in the DDL system of the present invention has an on-hook power consumption of only 4 mW as compared to 100 to 150 mW in conventional SLIC designs. As a result of these power savings, the total power consumption for each subscriber loop in the on-hook state is approximately 10 mW; almost an order of magnitude less as compared to the conventional system.

Another feature unique to the DDL system of this invention is the power distribution scheme. The power that is being supplied to the DU 208 and RTs 210 over the six E1 links 300 is filtered such that any of the RTs 210 may draw power from any one or more of the six E1 links 300. FIG. 9 illustrates this power distribution scheme. At the TUI 202, a power filter 900 receives the +/−130 VDC and couples it onto the six E1 links 300. A similar power filter 900 is used at the DU end of the E1's to separate the power form the signal on each link and make the power on all links available to all RTs 210. This allows the power from all six E1 links 300 to be distributed as needed by RTs 210 such that if one E1 link 300 is carrying heavy traffic it can draw power from other E1 links 300. The power filters 900 can be implemented using well-known low pass filtering techniques such as phantom transformer networks or diode "OR" networks.

Internal Communication

The signaling functions of a telephone network refer to the means for transferring network related control information between the various terminals, switching nodes, and users of the network. The DDL system of the present invention employs Common Channel Signaling (CCS) on the E1 links between the TUI 202, the DU 208, and the RTs 210. CCS is characterized by the use of a single dedicated control channel for all signaling functions of an associated group of data channels. In this description, the system components use time slot (or channel) 16 of each E1 link for control communication.

For synchronous transmission, special line coding must be used to ensure that each receiver can synchronize a local sample clock to incoming signaling rate. The DDL system of the present invention employs the synchronous data link control (SDLC) protocol for data communications. SDLC is based on a zero-bit-insertion algorithm, similar to CCITT's high level data link control (HDLC), except it contain a special poll flag for loop operation. The loop operates as follows. The TUI 202 as the controller of the link, sends messages to RT's 210 and polls them to collect any messages they have for the TUI 202. RTs 210 and DUs 208 do not communicate with each other since there is no control information to communicate. When the TUI 202 is ready to collect messages from RTs 210 on an E1 link, it sends out a poll flag (binary 11111110). When an RT 210 detects the poll flag, it must determine if it has a message to send. If it does not, it simply repeats the poll flag back onto the loop. If it does have messages to send, it changes the last bit of the poll flag to a 1 making it a normal interframe fill flag, and transmits its message onto the loop. When the message has been transmitted, the RT 210 transmits a poll flag back onto the loop so the next RT 210 in the chain can transmit its message. The TUI 202 acts as both the originator and terminator of each loop, so every message it transmits eventually is received.

Call Processing, Maintenance and Administration

For call processing, each RT 210 checks the status of subscribers 100 by scanning line cards 700, and reports status to the TUI 202. The TUI 202 determines the appropriate actions to be taken, communicates with the CO switch 102, and sends commands to the RT 210 to control the line cards 700. The DU 208 is not involved in call processing.

For maintenance, each DDL component runs background checks of its processor circuitry. Each component is also responsible for monitoring power and taking protective actions if power thresholds are exceeded. The TUI 202 maintenance software controls execution of tests and audits on all other circuitry. The TUI 202 maintenance software is also responsible for alarm handling, fault isolation, and error recovery. Software downloads to all applicable system components are coordinated by the TUI 202 maintenance software. Maintenance access ports (MAPs) are provided at the TUI 202, at the DU 208, and at the RT 210. This port allows the maintenance personnel to monitor the key functions of the system by connecting a small portable computer to the system through a commonly used digital port such as RS-232. This connection is made at the TUI 202 by means of an electrical plug. Because of the frequently wet and contaminated environment experienced in the outdoors, the active electronics of the DU 208 and RT 210 are placed in an especially sealed membrane. Therefore, the MAPs for the DU 208 and the RT 210 are preferably made by means of an infrared link similar to the type used for remote control of home electronics. A transparent window in the sealing membrane is provided to permit these signals to move from the processor board to an infrared transceiver attached to the module near the window without exposing the electronics board to the elements. This system eliminates the need for sealed connections that must reliably seal even after several hundred connection cycles. The details of the DDL system packaging is described in a later section.

Administration is controlled by the administration software in the TUI 202. The RTs 210 and DU 208 have simple administration software that is capable of configuring their respective components when administration commands are received from the TUI 202.

Transmission Medium

While the above describes the transmission channels as using pairs of wires, these channels can be implemented with a variety of facilities including: coaxial cables, point-to-point microwave radio links, and optical fibers.

Applications involving a large number of circuits can be implemented more economically with wider bandwidth media such as coaxial cable system or fiber optics. A single coaxial cable can replace over 100 twisted pair wires, resulting in a drastic reduction of quantity of required wires. Furthermore, the wider bandwidth of the coaxial cable system allows for simultaneous transmission of cable television signals with obvious advantages. The cable TV spectrum is commonly limited to approximately 50 MegHz to 500 MegHz, with about 75 channels, each 6 MegHz wide. This leaves the lower 50 MegHz range available for telephone signals.

A system, such as the DDL system of the present invention, that is capable of supporting 1000 subscriber lines requires a digital bandwidth of about 13 Mbit/sec. In another embodiment, the DDL system of the present invention employs coaxial cables. This embodiment uses a simple frequency modulation modem design to accommodate the telephone data flow in the first 50 MegHz of the cable spectrum. Applying available encoding techniques such as Quadrature Amplitude Modulation (QAM), the system inserts the telephone data in a 3 MegHz spectrum. To facilitate the simultaneous transmission of CATV and telephone signal, a filtering mechanism at the DU 208 separates the individual E1s before passing them on to the RTs 210. The coaxial cables connect the TUI 202 to the DU 208, while the DU 208 RT 210 connection can be made by either coax cable, twisted pair wires, or combinations of both. Power can also be transmitted through the coax cable or separately via twisted pair wires. However, in embodiments using fiber optic systems, power would have to be transmitted separately via twisted pair wires, or batteries can be provided locally (near the distribution unit).

One drawback of the coaxial cable system is that it causes large attenuations for the higher frequency signals. Therefore, repeater circuits are required along the transmission line to provide for signal regeneration and amplification. The additional circuitry increases the potential for reliability problems. However, the lower frequencies, where the telephone signals are located, do not experience nearly as much attenuation. Thus a low pass filter that bypasses all repeater circuits allows the low loss telephone signals to bypass a malfunctioning repeater in the event of a repeater failure. This removes any potential telephone reliability problem associated with the coaxial cable.

A coaxial transmission media further reduces the cost of the RT 210 electronics. As previously discussed, the RT 210 includes E1 framer circuits to determine the starting point of each data frame. One of these circuits must be installed at each end of every E1 link. Given an additional pair of wires, the necessary timing information can be sent along with the digital data, eliminating the need for expensive framer circuits. This is clearly impractical in a system that uses twisted pairs since it increases the amount of copper by 50%.

However, because of the wide bandwidth of a coaxial cable, it is possible to transmit the timing information in a different frequency band, eliminating many expensive framer circuits from the system.

DDL System Packaging

The packaging for the components of the DDL system has been especially designed for cost-effective deployment and easy installation. Outdoor electronics is conventionally packaged in ventilated housings that shelter the electronics from the rain. Condensation due to temperature variations is prevented by the heat given off due to power loss in these large, low power systems. Only a few degrees of temperature differential is sufficient to prevent condensation on the circuit boards inside the housing and thus to prevent water damage. But to meet the stated performance and cost objectives of the present invention, it is necessary to deploy the outdoor portion of the system in small units very close to the subscriber. Additionally, as described elsewhere, the outdoor portion of the system must operate at a very low level of power to eliminate the need for batteries in the field. Accordingly, the DDL system uses sealed modular packaging units that individually seal each circuit board and employ sealed connectors to permit flexible deployment based on user demands.

Figure 8:
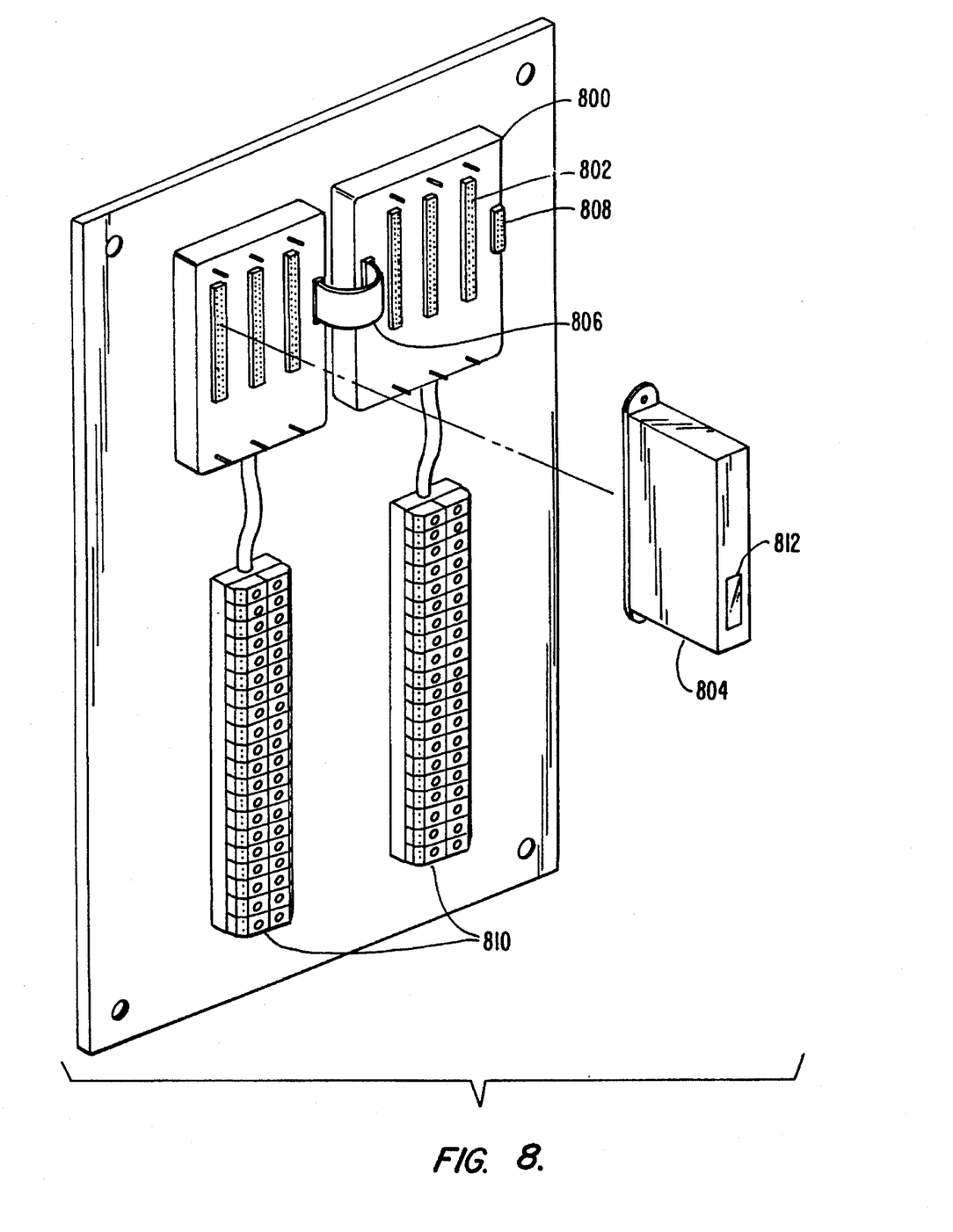
FIG. 8 illustrates an example of the modular packaging of the electronics used in the remote terminals of the DDL system of the present invention.

The initial investment to set up a DDL system includes a single TUI 202 and a PC 204 located in a central office, 12 twisted pair wires for connecting the central office to RTs 210, and RT 210 outdoor cabinets that are mounted on exterior walls or on pedestals. FIG. 8 shows the RT 210 without its protective cover to illustrate the modular packaging of the hardware used inside. The exterior box provides a measure of protection from mechanical damage and vandalism, but cannot be relied upon to seal out moisture because of frequent craftsman entry and its low cost construction. All of the electronic components inside the RT cabinet are therefore especially sealed.

The RT 210 includes a sealed backplane 800 that is modular in design. Each backplane module 800 includes a number of, for example three, sealed connectors 802 that receive sealed active electronics modules 804. The connectors 802 are also sealed using, preferably, a special sealing gel developed by Raychem corporation and described in detail in U.S. Pat. No. 5,111,497, hereby incorporated in its entirety for all purposes.

The sealed active electronics module 804 includes all RT 210 active circuitry required to support a group of subscriber terminals. It includes a transparent window 812 that allows the viewing of status lights mounted on the board. The transparent window 812 also allows for infrared signals to be transmitted to an infrared transceiver attached to the module to connect to a maintenance access port (MAP).

Each backplane module 800 can connect to another module 800 using a bus jumper 806 and gel sealed bus jumper connectors 808. The backplane module 800 connects to a terminal block 810 that incorporates a large number of, for example 96, sealed terminals. Over a period of time in the process of deploying the system, some of the connectors 802 and 808 may not be used. Unmated connectors are susceptible to damage by standing water and debris. To prevent this type of damage, each connector is provided with a cap that will protect the connectors until it is used. To ensure that all of the connectors are covered either by a module or a protective cap, two pins are included in the protective cap and the active modules 804 to activate an "uncovered connector alarm." In the preferred embodiment, these two pins are snorted together. The RT 210 or the DU 208 processor scan these contacts and determine if they are all shorted. If any are not shorted, then an alarm in the TUI 202 will sound to alert the administration so that the condition can be corrected.

Since in its preferred embodiment the present invention places a major part of the system electronics outdoors, it is crucial that the seal integrity of each active electronics module 804 be assured. To monitor the status of these sealed modules, a humidity sensor is installed in each active module 804. The humidity sensors are scanned by the RT 210 or the DU 208 processor. If the humidity in the sealed module environment rises above a certain level, for example 70%, an alarm in the TUI 202 will sound to alert the administration so that the leaking module can be replaced and repaired.

It should be noted that it is the unique distributed nature and modular design of the DDL system of the present invention that allows for the sealing of the terminals, connectors and modules. In the conventional system where power consumption and equipment density is much higher, overheating is a major concern. As a result constant air flow is crucial which necessarily precludes the use of sealing material in most circumstances.

The RTs 210 are placed in secure enclosures, preferably with two compartments. One compartment encloses the electronic components (active electronics modules 804), and the other encloses the wiring terminals (terminal blocks 810). These compartments are locked by means of two special wrenches, one opens the wiring compartment only, while the other provides access to both compartments. For further security, the RT 210 cabinets are equipped with intrusion alarms. Hall effect, or other similar devices can be employed to trigger an alarm condition at the central office indicating opening of either compartment. An alarm override can be requested at the administration console.

Therefore, this system allows the user to acquire the more expensive electronics modules 804 over a period of time, keeping the initial costs to a minimum. With the subscriber wiring (from the RTs 210 to subscribers 100; a relatively short distance) for all potential subscribers installed during the construction phase of a new development, adding more subscribers to the DDL system becomes as easy as plugging in a new active electronics module 804.

In conclusion, the present invention offers a digital loop carrier system with a distributed architecture that provides for rapid and cost-effective deployment of telephone services. While the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A distributed digital loop (DDL) telephone system providing telephone services for a plurality of subscribers comprising:

a trunk unit interface, centrally located and coupled to a central office switch via a first digital transmission medium;

said trunk unit interface comprising:
   a processor;
   a time slot interchange unit for connecting any internal DDL time slot to any central office switch time slot;
   at least one tone receiver;
   a tone generator; and
   a control bus coupling said processor to said time slot interchange unit, said at least one tone receiver, and said tone generator;

at least one distribution unit, located close to said plurality of subscribers and coupled to said trunk unit interface via a second digital transmission medium; and at least one remote terminal, located close to said plurality of subscribers and coupled to said at least one distribution unit via a third digital transmission medium, said at least one remote terminal for supporting a plurality of subscriber equipment.

2. The DDL system of claim 1 wherein said first digital transmission medium employs coaxial cables.

3. The DDL system of claim 1 wherein said second digital transmission medium employs coaxial cables.

4. The DDL system of claim 1 wherein said first and second digital transmission mediums employ coaxial cables, and wherein said coaxial cables carry both telephone and video signals.

5. The DDL system of claim 1 wherein said first digital transmission medium comprises fiber optics for data transmission and twisted pair for power transmission.

6. The DDL system of claim 1 further comprising a user interface means coupled to said trunk unit interface for user administration and maintenance of the DDL system.

7. The DDL system of claim 6 wherein said user interface means is a personal computer.

8. The DDL system of claim 1 wherein said trunk unit interface further comprises:

at least one E1 framer card coupled to said control bus, for controlling E1 links; and an R2MF card coupled to said control bus, for providing R2 protocol tone generation and detection.

9. The DDL system of claim 8 wherein said trunk unit interface further comprises:

a second processor coupled to said control bus, providing for interface with a plurality of different types of switch links;

a tone detector coupled to said control bus, for detecting continuity test tones for SS7 protocol; and an auxiliary slot coupled to said control bus for expansion of the system.

10. The DDL system of claim 1 wherein said first digital transmission medium comprises a first plurality of E1 links and said second digital transmission medium comprises a second plurality of E1 links.

11. The DDL system of claim 10 wherein said first plurality of E1 links comprises four E1 links and said second plurality of E1 links comprises six E1 links.

12. The DDL system of claim 10 wherein said at least one remote terminal is a plurality of terminals, and wherein said at least one distribution unit comprises:

a switch network implementing a cross point switch, coupled between said second plurality of E1 links and said plurality of remote terminals, said switch network for switching any one of said plurality of remote terminals to any one of said second plurality of E1 links; and a processor, coupled to said switch network, for controlling said switch network.

13. The DDL system of claim 12, wherein said plurality of remote terminals couple to said distribution unit in a logical ring and a physical star.

14. The DDL system of claim 12, wherein said processor communicates with said trunk unit interface via one of said second plurality of E1 links, and wherein said processor controls a switching of said switch network according to power consumption of said plurality of remote terminals.

15. The DDL system of claim 12 wherein said distribution unit comprises a power sharing circuit coupled to said second plurality of E1 links and said plurality of remote terminals, said power sharing circuit for filtering power to allow any one of said plurality of remote terminals to draw power from any one or more of said second plurality of E1 links.

16. The DDL system of claim 10 wherein each one of said plurality of remote terminals comprises:
- a plurality of line circuits for driving a corresponding plurality of subscriber equipment; and
- a processor means coupled to said plurality of line circuits for controlling said plurality of line circuits.

17. The DDL system of claim 16 wherein said plurality of subscriber equipment comprise any combination of analog and digital telephones, computers and pay phones.

18. The DDL system of claim 16 wherein each one of said plurality of line circuits comprises a subscriber loop interface circuit using transformer means.

19. The DDL system of claim 16, wherein power consumption of said line circuit is less than 20 mW in an on-hook state.

20. The DDL system of claim 16, wherein said line circuit provides 35 volts on-hook, 21 mA off-hook, and less than 1 mA under a blocked condition.

21. The DDL system of claim 10 wherein said third digital transmission medium is a third plurality of E1 links, and said at least one distribution unit comprises a plurality of E1 cards, each one of said plurality of E1 cards comprising:
- at least one E1 link unit for connection to one of said second plurality of E1 links, and
- a cross connect switch coupled to said at least one E1 link unit and a subset of said plurality of remote terminals through a corresponding subset of said third plurality of E1 links,
- wherein, said cross connect switch programmably switches a selected one of said subset of said plurality of remote terminals onto an associated one of said second plurality of E1 links.

22. The DDL system of claim 21 wherein said subset of said plurality of remote terminals and said corresponding subset of said third plurality of E1 links couple to said cross connect switch in a logical ring and a physical star.

23. A distributed digital loop (DDL) telephone system providing telephone services for a plurality of subscribers, comprising:
- a trunk unit interface, centrally located and coupled to a central office switch via a first digital transmission medium, and capable of interfacing with said central office switch, said trunk unit interface comprising:
  - a time slot interchange unit,
  - a processor,
  - and a bus coupling said time slot interchange unit to said processor; and
- at least one remote terminal, located close to said plurality of subscribers and coupled to said trunk unit interface via a second digital transmission medium, said at least one remote terminal comprising:
  - a plurality of line circuits for providing analog tip and ring interface to a plurality of subscribers, each of said plurality of line circuits having subscriber loop interface circuits with power regulator circuitry,
  - a processor, and
  - a bus coupling said processor to said plurality of line circuits,
- wherein said at least one remote terminal and the plurality of subscribers are powered from said central office.

24. A distributed digital loop (DDL) telephone system providing telephone services for a plurality of subscribers, comprising:
- a trunk unit interface, centrally located and coupled to a central office switch via a first digital transmission medium;
- at least one remote terminal located close to said plurality of subscribers and coupled to said trunk unit interface via a second digital transmission medium, said at least one remote terminal secured by an enclosure that comprises:
  - at least one backplane comprising at least one connector;
  - at least one active electronics module having a connector adapted to plug into said at least one connector of said at least one backplane, said module for incorporating active circuitry required to support a subset of the plurality of subscribers; and
  - a terminal block, connected to said at least one backplane, for incorporating a plurality of terminals.

25. The DDL system of claim 24 wherein said at least one backplane comprises bridging connectors for connecting to another backplane using a bridging bus.

26. The DDL system of claim 25 wherein an unused connector from any one of said at least one connector of said at least one backplane and said bridging connectors is covered by a matching cap.

27. The DDL system of claim 26 wherein an unmated connecting element from any one of said at least one connector of said at least one backplane and said bridging connectors activates an alarm.

28. The DDL system of claim 25 wherein a capacity of said at least one remote terminal can be expanded incrementally by inserting additional ones of said at least one active electronics module in said backplane connector.

29. The DDL system of claim 28 wherein said at least one active electronics module is protected by an especially sealed cover and wherein all connectors are sealed.

30. The DDL system claim 29 wherein all connectors are gel sealed.

31. The DDL system of claim 29 wherein said sealed cover comprises a transparent region providing for viewing of light emitting elements.

32. The DDL system of claim 28 wherein said at least one active electronics module further comprises a humidity sensor coupled to a system processor.

33. The DDL system of claim 32 wherein said system processor activates an alarm if said humidity sensor indicates a humidity level inside said at least one active electronics module to be above a predetermined threshold.

34. A distributed digital loop (DDL) telephone system providing telephone services for a plurality of subscribers, comprising:
- a trunk unit interface, centrally located and coupled to a central office switch via a first digital transmission medium, said trunk unit interface comprising:
  - a time slot interchange unit,
  - a processor,
  - and a bus coupling said time slot interchange unit to said processor; and
- at least one remote terminal, located close to said plurality of subscribers and coupled to said trunk unit interface via a second digital transmission medium, said at least one remote terminal comprising:
  - an environmentally sealed active electronics module enclosing a plurality of line circuits, a processor, and a bus coupling said processor to said plurality of line circuits, and
  - a terminal block coupled to said environmentally sealed active electronics module via a connector cable, said terminal block comprising a plurality of environmentally sealed subscriber terminals.

35. In a telephone switching system having a central office switch providing telephone services to a plurality of subscribers via a network of transmission media, a trunk interface unit for interfacing with the central office switch, comprising:

a time slot interchange unit for connecting any time slot from the network of transmission media to any central office switch time slot;

a clock synchronization circuit;

at least one tone receiver;

a tone generator coupled to said processor for generating tones required by subscriber services;

a processor coupled to a user interface, said processor for controlling system configuration and administration in response to commands from said user interface; and a control bus coupling said processor to said time slot interchange unit, said clock synchronization circuit, said at least one tone receiver, and said tone generator, wherein the trunk interface unit is capable of independently interfacing with a variety of central office switches.

* * * * *

UNITED STATES PATENT AND TRADEMARK OFFICE
CERTIFICATE OF CORRECTION

PATENT NO. : 5,592,475
DATED : January 7, 1997
INVENTOR(S) : Gliga et al.

It is certified that error appears in the above-identified patent and that said Letters Patent is hereby corrected as shown below:

Column 5, line 65 replace "(ROM), by--(ROM)).--

Column 8, line 45 replace "filed." by-field.--.

Column 9, line 56 replace "form" by--from--;

Column 12, line 66 replace "snorted" by--shorted--.

Claim 12, lines 1-2 (Column 14, lines 47-48), delete "said at least....wherein".

Claim 15, lines 1-2 (Column 14, lines 66-67) replace "distrubtion..coupled" by--power sharing circuit of said disbrution unit couples--.

Claim 30, line 1 (Column 16, line 36) after "system" insert --of--.

Signed and Sealed this

Fifth Day of January, 1999

Attest:

*Attesting Officer*

*Acting Commissioner of Patents and Trademarks*